(12) United States Patent
Helm et al.

(10) Patent No.: US 8,726,772 B2
(45) Date of Patent: May 20, 2014

(54) SELF-CENTERING STEADY REST

(76) Inventors: Peter Helm, Meckenbeuren (DE);
Eckhard Maurer, Oberteuring (DE)

( * ) Notice: Subject to any disclaimer, the term of this patent is extended or adjusted under 35 U.S.C. 154(b) by 267 days.

(21) Appl. No.: 12/931,570

(22) Filed: Feb. 4, 2011

(65) Prior Publication Data

US 2011/0209591 A1 Sep. 1, 2011

(30) Foreign Application Priority Data

Feb. 8, 2010 (EP) .................................. 10152923

(51) Int. Cl.
*B23Q 1/76* (2006.01)
(52) U.S. Cl.
CPC ........................................ *B23Q 1/76* (2013.01)
USPC ............................................. 82/162; 82/164
(58) Field of Classification Search
USPC .............. 82/162, 163, 164; 192/56.1; 464/37; 279/108
IPC ....... B23Q 1/76,1/24; B23B 5/22, 29/16; B24B 41/06
See application file for complete search history.

(56) References Cited

U.S. PATENT DOCUMENTS 4,546,681 A * 10/1985 Owsen ............................ 82/162
4,754,673 A * 7/1988 Hiestand ......................... 82/164

FOREIGN PATENT DOCUMENTS

| DE | 874548 | 4/1953 |
| DE | 3611201 | 10/1986 |
| EP | 0562180 | 12/1993 |
| JP | 01092008 A * | 4/1989 |
| JP | 2000006017 A * | 1/2000 |

OTHER PUBLICATIONS

English machine translation of DE 3611201 A1.*
English machine translation of JP 2000-6017.*
English machine translation of JP 1-92008.*

* cited by examiner

*Primary Examiner* — Andrea Wellington
*Assistant Examiner* — Alan Snyder
(74) *Attorney, Agent, or Firm* — Pandiscio & Pandiscio (57) ABSTRACT

A self-centering steady rest (1) for clamping a workpiece (4) on a turning machine, with three holding elements (5, 6, 7) mounted in a housing (2) and held adjustably in a common plane, the two outer holding elements (5, 7) being configured as swivelling angled levers supported in the housing (2) and in a mirror-image arrangement with one another, and the middle holding element (6) is guided in the housing (2) by means of middle piece (8) in a driveable connection with a drive unit (61) to be axially moveable in the direction of the workpiece (4), with control surfaces (9) being provided on the middle piece (8) wherein the two outer holding elements (5, 7) interact with the control surfaces (9) to achieve clamping movements of the three holding elements (5, 6, 7) and are performed by means of a drive device (21, 61) which is operated electrically, and which performs rotational movement that is converted into an axial advance and return movement performed by the middle piece (8).

12 Claims, 9 Drawing Sheets

SELF-CENTERING STEADY REST

BACKGROUND OF THE INVENTION

1. Field of the Invention

The invention relates to a self-centering steady rest for clamping and/or holding a workpiece on a turning machine. The steady rest is provided with three holding elements mounted in a housing of the steady rest and held adjustably in a common plane, of which two outer holding elements are configured as swivelling angled levers supported in the housing and in a mirror-image arrangement with one another, and the middle holding element is guided in the housing by means of a drive unit and a middle piece in a driveable connection with the drive unit in such a way as to be axially moveable in the direction of the workpiece, with control surfaces being provided on the middle piece, in which case the two outer holding elements interact with the control surfaces by means of inner ends of the holding elements.

Steady rests of this kind have been produced by the Applicant for decades and have been marketed successfully.

For example, a steady rest of this kind is disclosed in EP 0 562 180 B1.

2. Description of the Prior Art

Generally these steady rests are driven by a pressure piston, by means of which the middle piece is moved axially in the direction of the workpiece to be clamped, either forwards or backwards from the workpiece. The pressure piston in this case has hydraulic fluid acting on it, with the effect that the pressure piston performs the forwards and backwards movements required for clamping and unlocking movements.

For decades now, there has been a significant requirement for a different kind of drive device to be provided as an alternative to the hydraulic drive with pressure piston which has been disclosed.

SUMMARY OF THE INVENTION

It is therefore an object of the present invention to provide a self-centering steady rest of the aforementioned kind such that the advance and clamping movements of the three holding elements of the steady rest are performed by means of a drive device which is operated electrically, in particular by means of an electric motor, which performs a rotational movement that is converted into an axial advance and return movement performed by the middle piece. Furthermore, it should be possible exactly to measure and monitor the advance and clamping movements of the steady rest by means of the position of the electric motor. In addition, it should be possible to use the rotational movements of the electric motor both for the fastest possible advance and for the clamping movements of the arms of the steady rest.

These aims are achieved in accordance with the present invention by a drive unit driven by an electric motor, the rotational movements of the electric motor being converted by the drive unit into at least two different axial advance speeds of the middle piece with resulting force components vectored onto the workpiece, and in order to set the corresponding advance speed of the middle piece, between it and the electric motor, a clutch with a constrained action is used, by means of which the drive unit is changed over automatically into two different shift positions.

Other advantageous further embodiments of the invention are disclosed herein.

A drive unit is arranged between the electric motor with changeover function and the middle piece which is to be moved axially in the direction of the workpiece, in which case the drive unit is in an active driving connection both with the electric motor and also with the middle piece, with the effect that the rotational movements of the electric motor are initially converted into a first axial advance speed of the middle piece. After the three holding elements of the steady rest have reached a contact position on the workpiece, it is advantageous for the rotational movement of the electric motor to be used for clamping the three holding elements, because the drive unit converts the rotational movements into a second advance speed of the middle piece, with the effect that advance and clamping forces directed onto the workpiece are converted into two force contributors of different kinds.

The different advance speeds of the middle piece are achieved by means of a clutch which is switched in a constrained arrangement, by means of which the drive unit can be automatically changed over to two different switching positions. As a result, the rotational movement of the electric motor can be used starting from the opened position of the three holding elements until they reach their clamping position on the workpiece, without any interruption in time, in order to induce an advance movement as well as a clamping movement on the middle piece and the three holding elements that are in a driveable connection with the middle piece.

Furthermore, the axis of rotation of the electric motor can be arranged in a preferred embodiment in parallel to or flush with the direction of movement of the steady rest, with the effect that compact and therefore small installation dimensions can be achieved for the entire steady rest with electric motor.

It is particularly advantageous that the control unit of the electric motor ensures that the three holding elements which hold the workpiece centrally within them are neither damaged when they make contact, nor do they damage the surface of the workpiece. Immediately before the three holding elements make contact with the surface of the workpiece, this position is registered and the speed of the electric motor is briefly reduced. Following this, the torque of the electric motor is increased, because the freedom of movement of the holding elements is limited. The rotations of the electric motor can be measured, with the result that the holding elements are braked before they come into contact with the surface of the workpiece, by reducing the speed of rotation of the electric motor. By means of the position of the electric motor, it is possible to protect the area of the holding elements because the machine tool takes account of the position of the holding elements when it carries out its movements.

There is no time lag in the transition between the high-speed and the clamping movement or vice versa, with the effect that there is an extremely fast advance movement by the three holding elements in the direction of the workpiece, and a further restricted rotation of the electric motor within a further very short time period means that the workpiece is reliably clamped between the three holding elements.

BRIEF DESCRIPTION OF THE DRAWINGS

The drawings show a sample embodiment configured in accordance with the present invention, the details of which are explained below. In detail.

DESCRIPTION OF THE PREFERRED EMBODIMENTS

Figure 1:
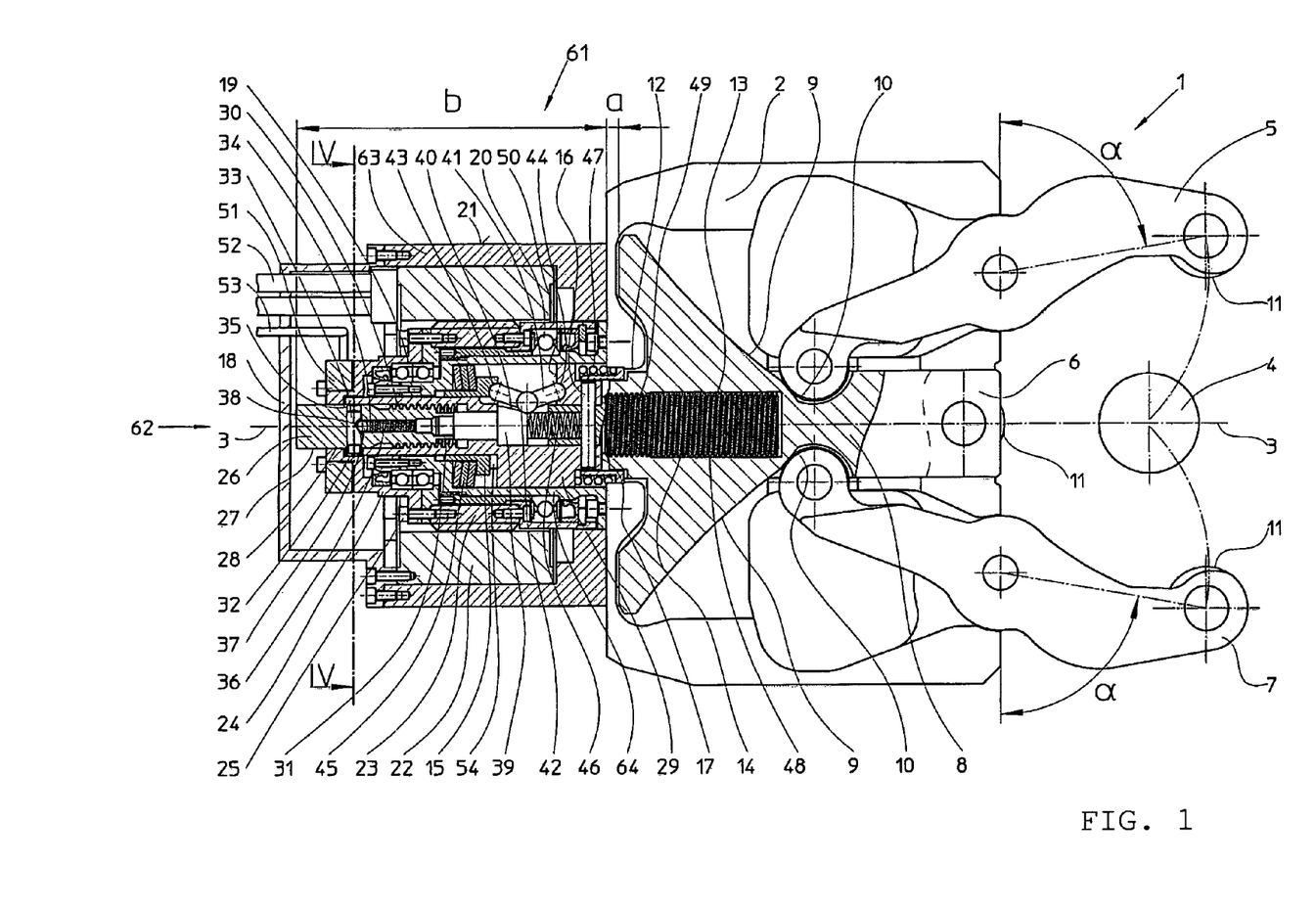
FIG. 1 shows a steady rest with three holding elements arranged in a common plane in which the holding elements can be moved towards a workpiece by means of an axially movable middle piece held in the housing of the steady rest, and with a drive unit arranged between the middle piece and an electric motor, by means of which the middle piece can be moved axially, in a sectional view and in the initial position.

FIG. 1 shows a self-centering steady rest 1 for clamping and/or holding a workpiece 4 on a turning machine. There are three holding elements 5, 6, 7 mounted on a housing 2 of the steady rest 1 in a manner that is explained in more detail below. The two outer holding elements 5 and 7 are configured as angled levers in a mirror-image arrangement with one another which are articulated on the housing in a swivelling arrangement. The middle holding element 6 is axially formed on a middle piece 8 which can be moved in the direction of the workpiece 4 or vice versa and is held in a rotationally fixed arrangement in the housing 2.

Furthermore, the middle piece 8 has two outwardly facing control surfaces 9 which are opposite to one another in a mirror-image arrangement. The inner free ends 10 of the two outer holding elements 5 and 7 are in contact with the control surfaces 9 under preload during the clamping movement, although they can also be coupled to these surfaces in a different manner, with the effect that the control surface 9 and the free ends 10 of the holding elements 5, 7 are on continuous active contact with one another. Therefore, as soon as the middle piece 8 is moved towards the workpiece 4, the holding elements 5, 6 and 7 move synchronously in such a way that they make contact with the workpiece 4 jointly and at the same time with their workpiece contact elements 11, for example rollers, grippers, pads. The movement between the opening angle α of the two outer holding elements 5 and 7 and the desired contact of the three holding elements 5, 6 and 7 on the workpiece 4 is referred to as advance movement or rapid stroke. Once the three holding elements 5, 6 and 7 are in contact with the surface of the workpiece 4, this must be clamped. The clamping movement of the three holding elements 5, 6 and 7 which must take place after the advance movement can be seen in FIGS. 2 and 3. At the end of the clamping movement, the rollers 11 of the holding elements 5, 6 and 7 are in contact with the workpiece 4 under preload, with the effect that the workpiece 4 is reliably clamped and supported on the steady rest 1. The rollers 11 can also be configured as pads or grippers.

Starting from the initial position shown in FIG. 1, in which the three holding elements 5, 6 and 7 are each at the largest possible distance from the workpiece 4 which is to be clamped, the elements should now be advanced towards the workpiece 4 by an electric motor 21, if possible without any time lag, and at the end of the advance movement the electric motor 21 should also enable the clamping movement of the three holding elements 5, 6 and 7 to take place.

The electric motor 21 consists of a stator 22 and a rotor 23. A flange 24 is attached to the rotor 23 by means of bolts 25. The flange 24 has a tubular section in which internal gearing 28 is worked. As a result, the rotational movement of the rotor is transferred to the flange 24 and, from this, onto a shaft 26.

Figure 7:
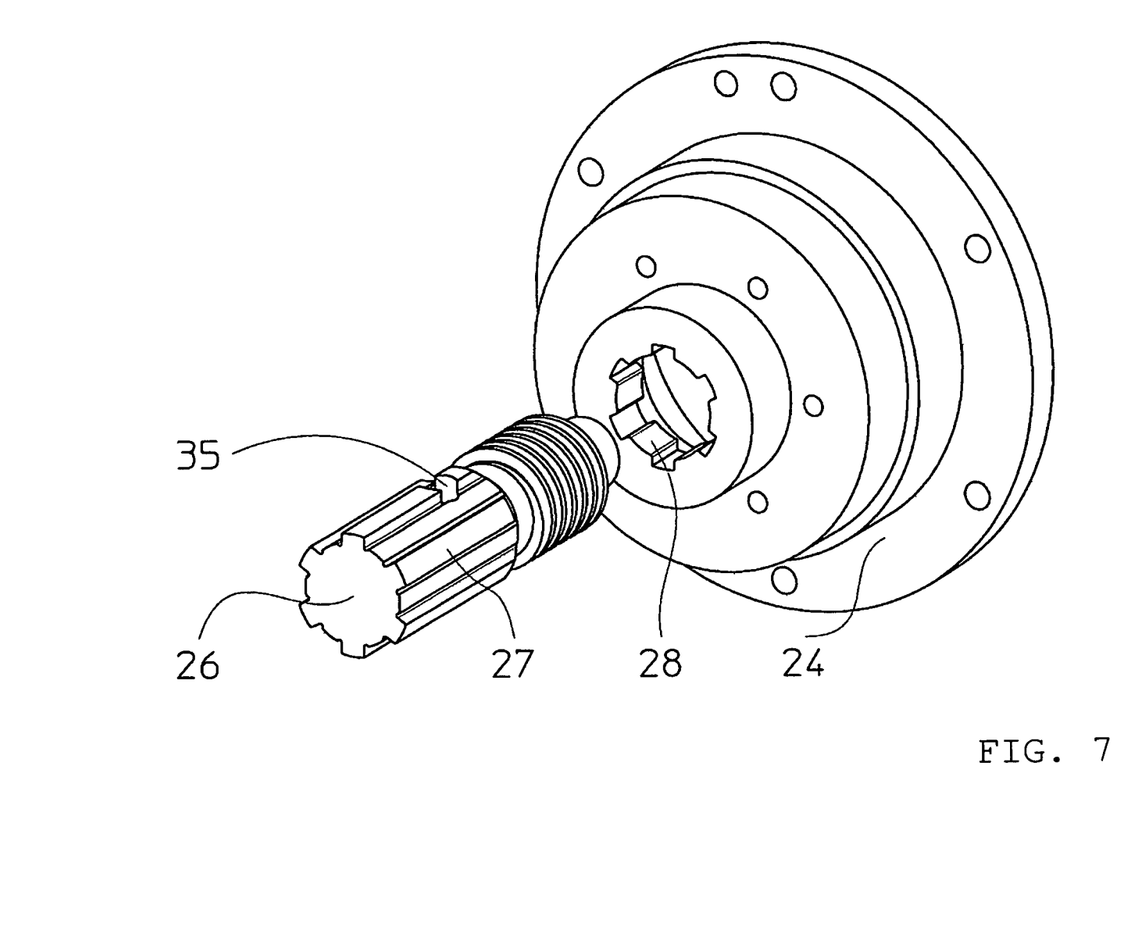
FIG. 7 shows a perspective view of a flange and a shaft which form part of the drive unit in accordance with FIG. 1, in a pre-mounted status.

A drive unit 61 arranged inside a drive unit housing 62 attached to the housing 2 now permits the rotational movement of the electric motor 21 to be converted into an axial advance movement which acts on the middle piece 8. The drive unit 61 in this case primarily consists of the shaft 26 which is in a driveable connection with the flange 24 by means of the internal gearing 28, because there is external gearing 27 worked into the outside of the shaft 26 and this external gearing 27 engages in the internal gearing 28. In FIG. 7 in particular, it is possible to see that the external gearing 27 of the shaft 26 is aligned in parallel with a longitudinal axis 3 of the steady rest 1 and that, as a result, the shaft 26 can be pushed along the internal gearing 28 of the flange 24.

A hollow shaft 29 should be seen as a further component of the drive unit 61, with this hollow shaft 29 being located in a releasable, form-locking active connection with the shaft 26 during the advance movement of the three holding elements 5, 6 and 7 by means of a clutch 62. The clutch 62 can be configured as a straightforward slip clutch, with the effect that a force-locking active connection is established between the shaft 26 and the hollow shaft 29, by means of which the force transmission is released when a predefined torque is exceeded.

Figure 2:
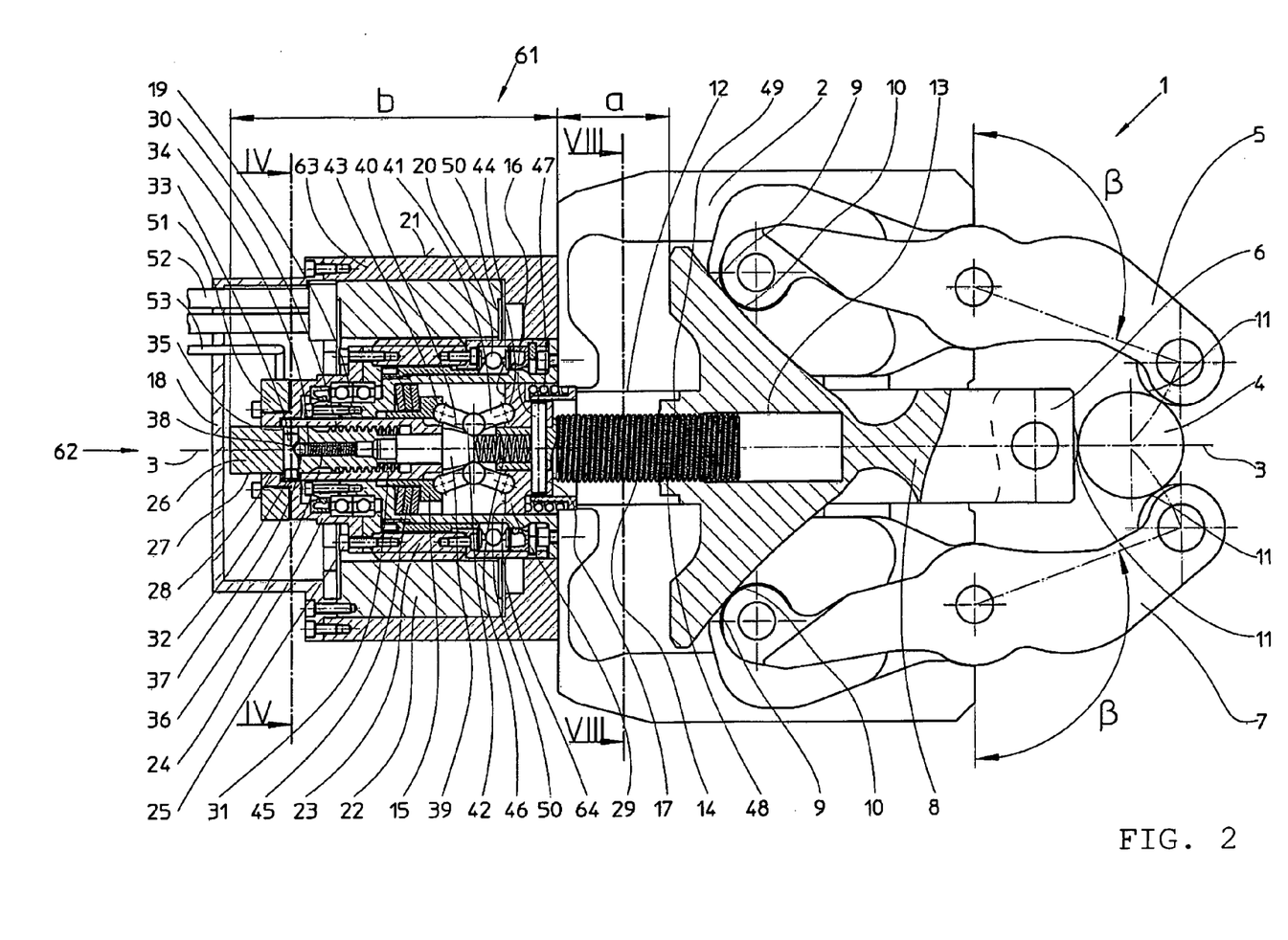
FIG. 2 shows the steady rest in accordance with FIG. 1 after completion of the advance movement of the three actuating devices onto the workpiece.

The clutch 62 is chiefly formed by a pin 33 inserted in a hole 35 which runs at right angles to the longitudinal axis 3 and is worked into the shaft 26. This arrangement can also be turned through 90°. In the initial status as shown in FIG. 1, and before initiation of the clamping movement of the holding elements 5, 6 and 7, as shown in FIG. 2, the pin 33 is pushed into a recess surface 32 which is worked into the inside of the hollow shaft 29.

In addition, a hole 34 is provided in the shaft 26 flush with the longitudinal axis 3 and a coiled compression spring 36 is inserted into the hole 34. A ball 37 is arranged on the free end of the coiled compression spring 36 facing the pin 33, and the ball 37 is pressed by the coiled compression spring 36 into a notch 38 worked into the pin 33.

Figure 4:
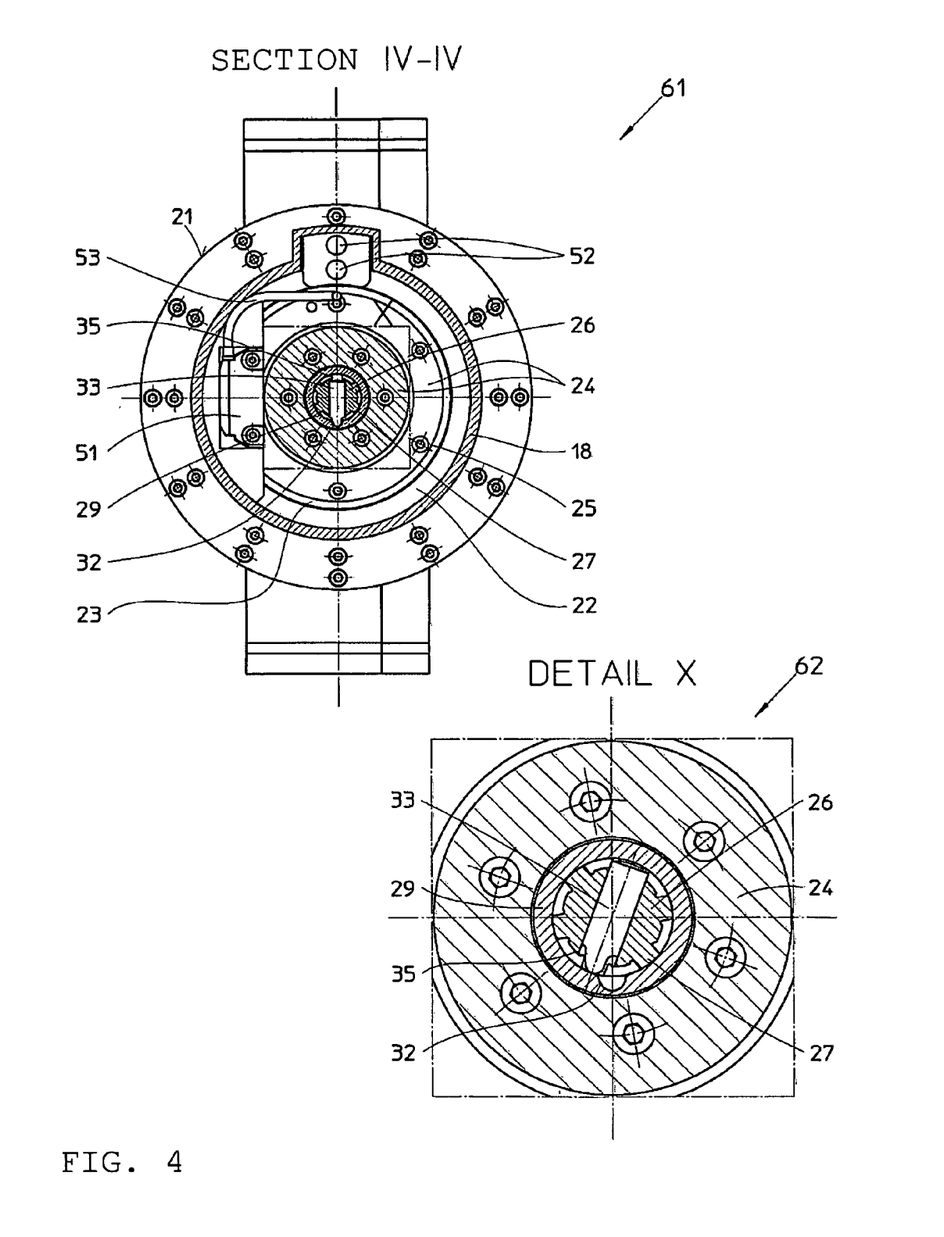
FIG. 4 shows the steady rest in accordance with FIG. 2 along a section IV-IV.
Figure 5:
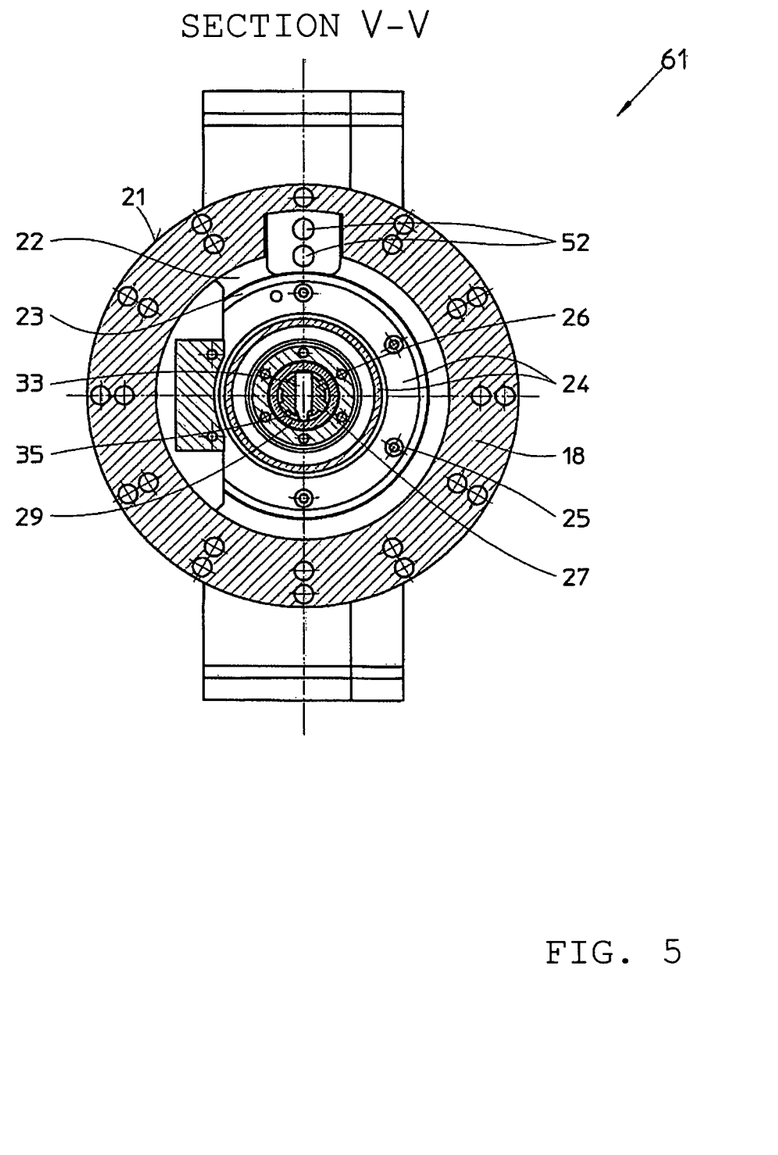
FIG. 5 shows the steady rest in accordance with FIG. 3 along a section V-V.

FIGS. 4 and 5, in particular, show that one end of the pin 33 is in contact with a radial wall and that a wall is provided at the opposite end which runs at an angle to the radial direction, with the effect that the surface 32 is created which runs outward at an angle. The angled surface 32 in this case lies in the drive direction of the electric motor 21; the principal purpose of the radial wall is to serve as a stop for the pin 33, with the effect that the pin 33 cannot be lifted beyond the radial wall. The radial wall therefore holds the pin 33 in the recess 32 of the hollow shaft 29 by means of a force vector acting on the wall.

Figure 8:
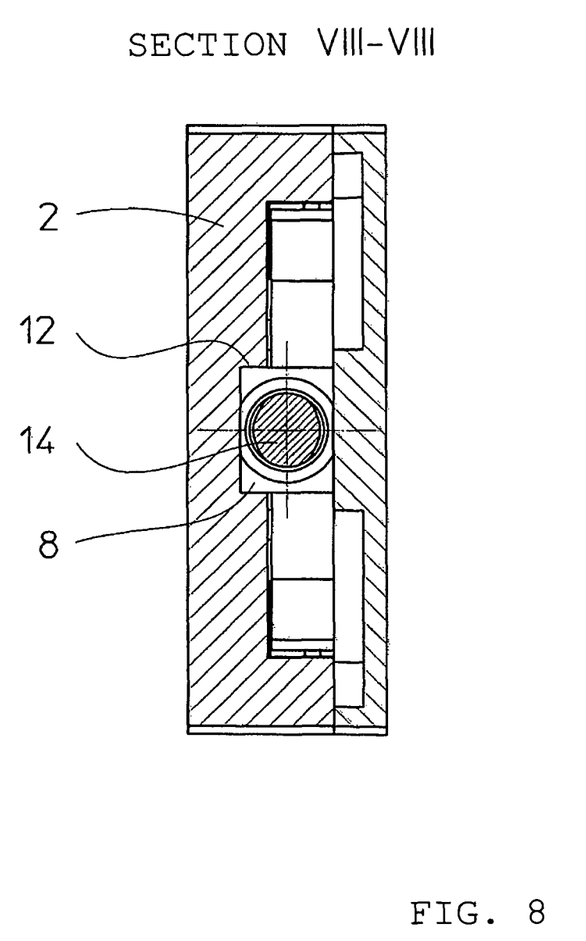
FIG. 8 shows the steady rest in accordance with FIG. 3 along a section VIII-VIII.

If the electric motor 21 is set to rotating, the middle piece 8 moves from the initial position shown in FIG. 1 towards the workpiece 4, because the flange 24 drives the shaft 26, which in turn drives the hollow shaft 29 via the clutch 62. As shown in FIG. 8, an accommodation opening 12 is worked into the housing 2 and the middle piece 8 is inserted into this opening 12 in an axially moveable, although rotationally fixed, arrangement.

Figure 9:
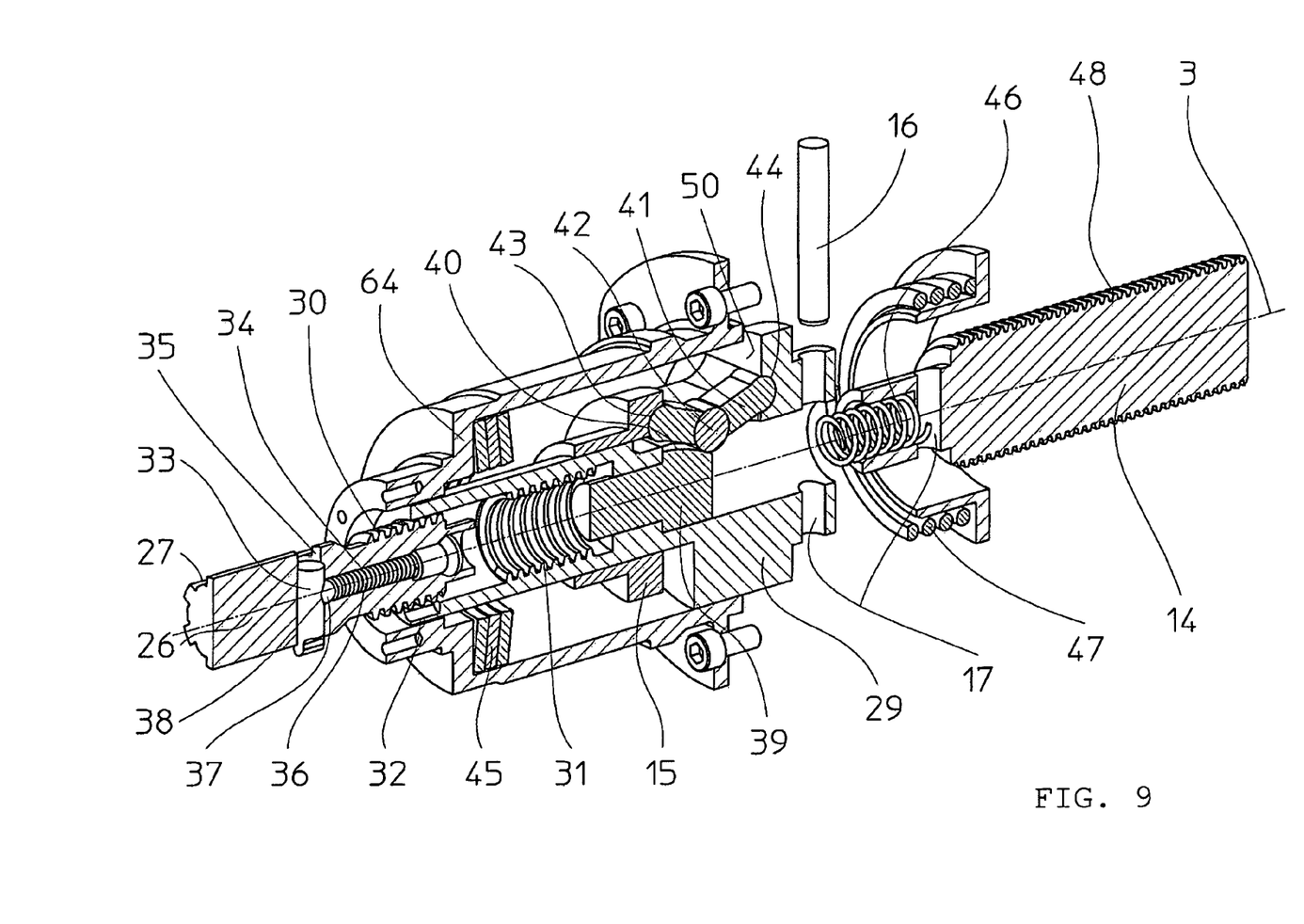
FIG. 9 shows the steady rest in accordance with FIG. 1, in the pre-mounted status and in a perspective view.

Furthermore, a threaded hole 13 is worked into the middle piece 8 and a threaded spindle 14 is screwed into it. The threaded spindle 14 is firmly connected to the hollow shaft 29 by means of a retaining pin 16. The design of the hollow shaft 29 can be seen in FIGS. 1 and 9. The rotational movements of the hollow shaft 29 therefore act on the threaded spindle 14, thereby inducing it to rotate. The middle piece 8 is held in a rotationally fixed arrangement in the housing 2, therefore there is a helical relative movement between the threaded spindle 14 and the middle piece 8. It is advantageous for the threaded spindle 14 to be equipped with a trapezoidal thread 48, with the effect that the rotational speed of the threaded spindle 14 is passed onto the middle piece 8 with a specific ratio, thereby guaranteeing that the first advance speed is available for the three holding elements 5, 6 and 7 and they are moved into contact with the workpiece in the shortest possible time.

A revolution counter 51, shown in FIG. 4, determines the angle position of the electric motor 21 and is evaluated by means of an electronic control unit which is not shown. The electronic control unit therefore permanently measures the position of the three holding elements 5, 6 and 7 in relation to the workpiece 4, namely by measuring the position of the electric motor 21, with the effect that the power of the electric motor 21 can be reduced directly before the holding elements 5, 6 and 7 make contact with the workpiece 4. Through this control measure, it is made possible for the rollers 11 of the holding elements 5, 6 and 7 not to strike the workpiece 4, thus possibly damaging it or exposing themselves to damage by the workpiece 4 itself. In addition, this control measure reduces noise emissions.

Figure 6:
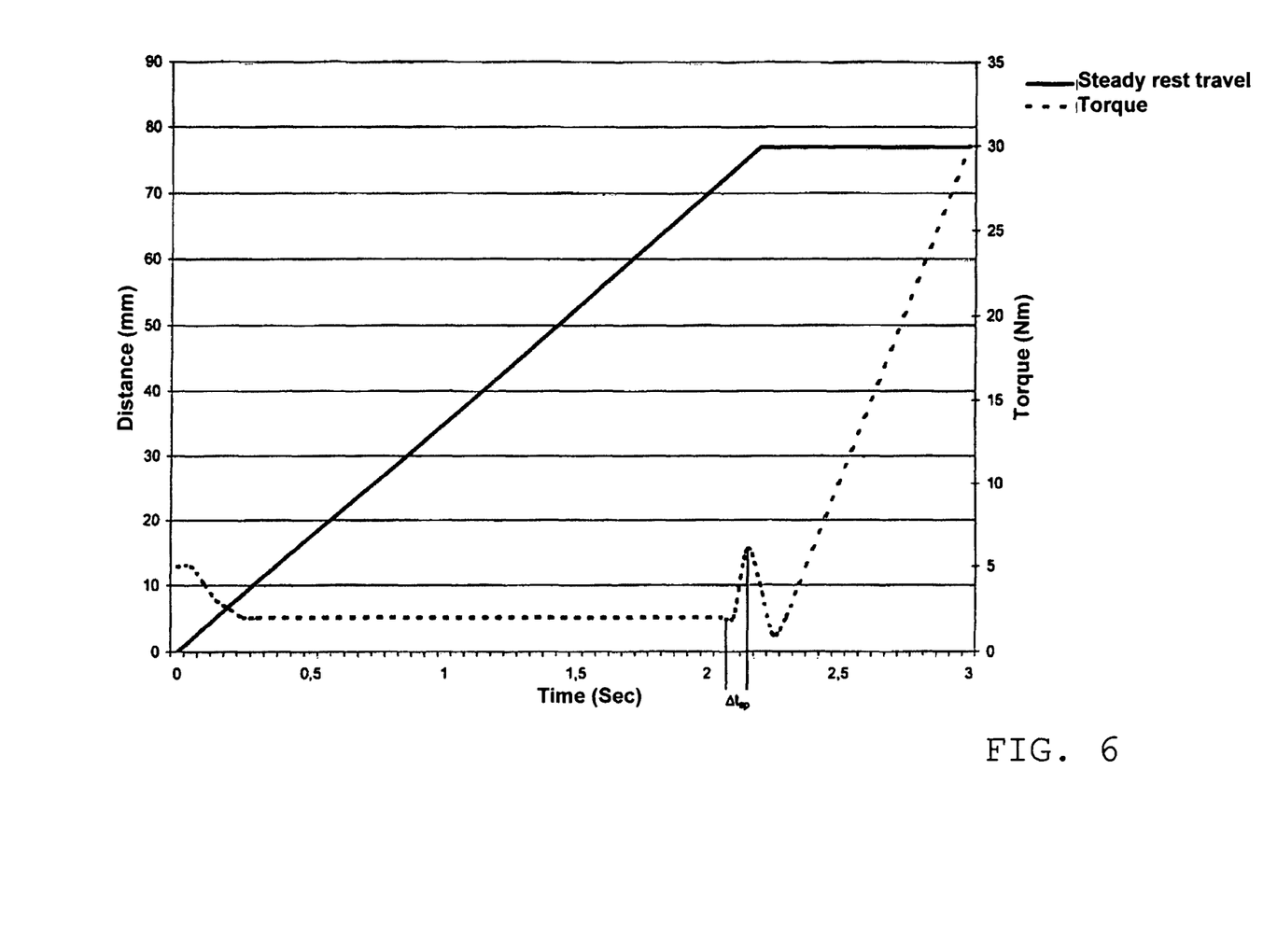
FIG. 6 shows the torque profile of the electric motor in accordance with FIG. 1 for driving the steady rest, as well as the distance covered by the middle piece.

FIG. 6 shows the torque profile in relation to the distance covered for the three holding elements 5, 6 and 7, in the form of a diagram. Once the electric motor 21 has started, the torque settles at a constant value. As soon as the holding elements 5, 6 and 7 enter into an active connection with the workpiece 4, the torque that the electric motor 21 needs to exert rises considerably. In the drawn time interval Δ tsp (time interval for initiating the clamping movements in accordance with FIG. 2), the clutch 62 is released accordingly (as shown in FIG. 2) with the effect that the active driving connection between the shaft 26 and the hollow shaft 29 is interrupted. As soon as this unlocking has occurred between the shaft 26 and the hollow shaft 29, the torque of the electric motor drops to a value that is below the torque for the advance movement of the holding elements 5, 6 and 7, and subsequently rises in a linear profile until the clamping movement of the holding elements 5, 6 and 7 is ended.

The initiation of the clamping movement for the three holding elements 5, 6 and 7 is shown in FIG. 2. There, the pin 33 is still engaged in the recess 32. The increase in torque which is transferred via the holding elements 5, 6 and 7 onto the middle piece 8, the threaded spindle 14 and, from this, onto the hollow shaft 29, means that this torque increase acts on the pin 33. The surface 32 which extends at an angle to the radial plane runs in the direction of rotation of the electric motor 21, therefore the pin 33 can slip out of the recess 32 against the force applied by the coiled compression spring 36, with the effect that the form-locking active connection between the shaft 26 and the hollow shaft 29 is released.

At the same time, the shaft 26 continues to rotate, because the power flow or the torque provided by the electric motor 21 is not switched off. In order to achieve an axially acting clamping movement now, there is an external thread 30 worked into the outside of the shaft 26. An internal thread 31 is provided in the hollow shaft 29. The external thread 30 of the shaft 26 and the internal thread 31 of the hollow shaft 29 are therefore in a form-locking active connection, in the same way as gearing. As soon as the clutch 62 between the shaft 26 and the hollow shaft 29 is released, the shaft 26 continues to rotate with the effect that there is a relative rotation between the shaft 26 and the hollow shaft 29 via the internal and external threads 30 and 31.

Figure 3:
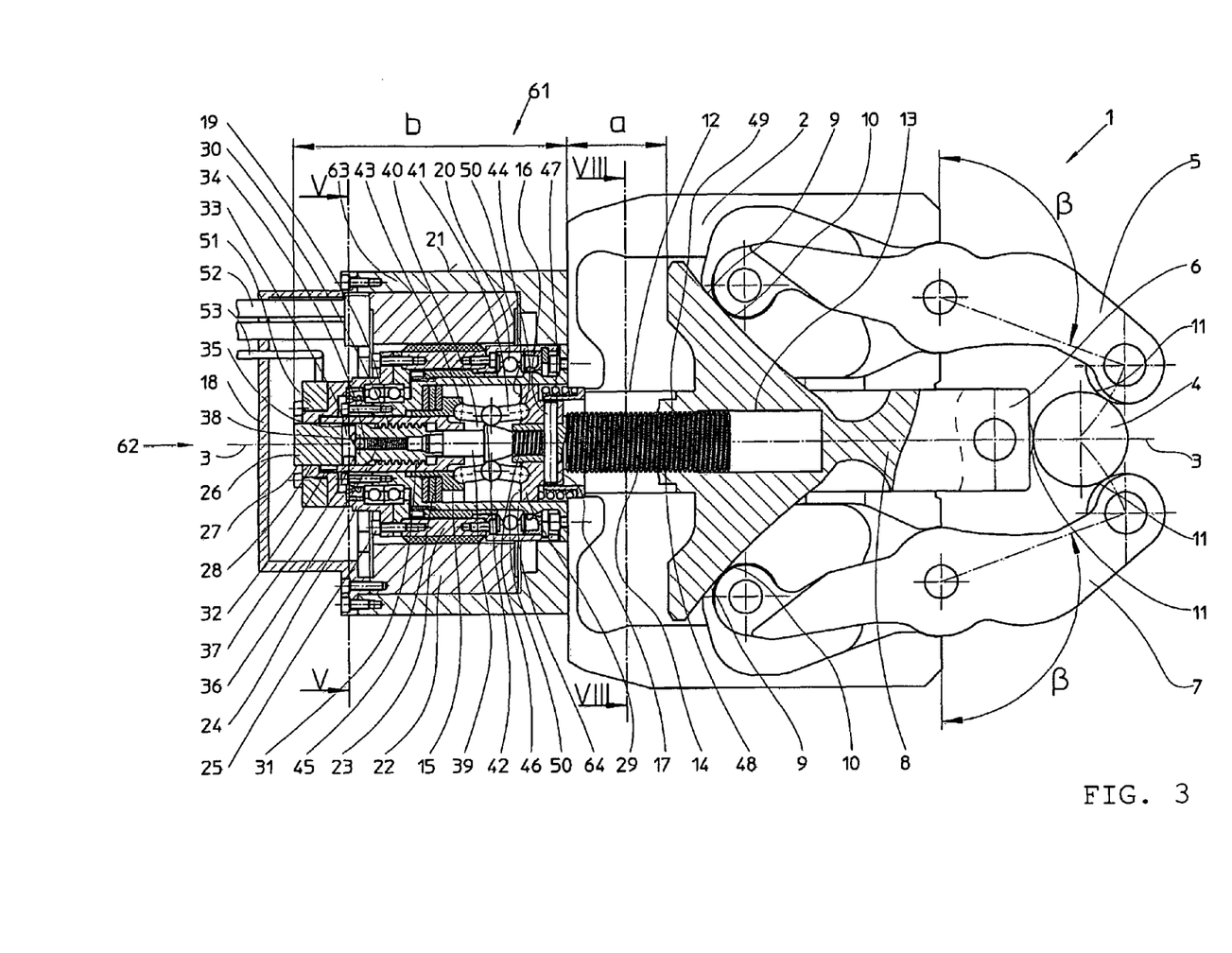
FIG. 3 shows the steady rest in accordance with FIG. 1 in a clamping position of the three holding elements.

The shifting movement in question, or the distance travelled, is indicated by the letters a and b in FIGS. 2 and 3.

As a result, the hollow shaft 29 is advanced in a helical movement towards the workpiece 4. A pin 39 is provided on the free end of the shaft 26. There is a contact surface between the shaft 26 and the pin 39. This can be seen in particular in FIG. 9.

The pin 39 has an area facing away from the shaft 26 which has a pyramid configuration. In this case, the outer contour of the pin 39 tapers towards the workpiece 4. The pyramid-shaped, free end 40 of the pin 39 acts on an inclined plane which supports a bell-crank lever 41 arranged on the pyramid-shaped free end 40, and by means of which a clamping force running in the direction of the tool is generated during the axial advance movement of the pin 39. FIGS. 2 and 3 show two bell-crank levers 41 which are located in pairs on a common plane and are inserted in a recess 50 worked into the hollow shaft 29. Only one bell-crank lever 41 is provided in FIG. 1, in order to show the structure of the hollow shaft 29 in the area of the pin 39.

The bell-crank lever 41 consists of a joint 42 lying on the pyramid-shaped free end 40, with two webs 43 and 44 attached to it. The free ends 43' or 44' of the webs 43, 44 are supported in the hollow shaft 29 and in a transmission element 15. A pack of dished springs 45 is arranged between the transmission element 15 which has a tubular cross section and is attached to the outer contour of the hollow shaft 29 by means of a rotation lock 54.

A bearing housing 64 enclosing the hollow shaft 29 accommodates the dished springs 45, with the transmission element 15 arranged in the inside of the hollow shaft 29. The bearing housing 64 is firmly connected to the steady rest housing 2, thereby ensuring that the axially vectored pressure force that results when the dished springs 45 are pushed together is reliably supported and runs in the direction of the longitudinal axis 3, i.e. to the workpiece 4.

Furthermore, a coiled compression spring 46 is provided between the pin 39 and the transmission element 15, by means of which a return force is exerted on the pin 39 as soon as the clamped condition is released for the workpiece 4.

FIG. 3 shows that the bell-crank lever 41 is opened out by the axial movement of the pin 39 in the direction of the workpiece 4. It is particularly advantageous if two bell-crank levers 41 are arranged in a pair opposite to one another on the pyramid-shaped free end of the pin 39. The free end 44' of the web 44 allocated to the bearing housing 64 is arranged on the pack of dished springs in this case. The clamping characteristic of the dished springs 45 and the clamping travel covered by the bell-crank lever 41 are known, therefore by means of the spring characteristic, it is possible to determine in advance precisely what clamping force is exerted by the dished springs 45 onto the workpiece via the bell-crank lever 41 onto the hollow shaft and therefore onto the threaded spindle 14, the middle piece 8, and the holding elements 5, 6 and 7. The revolution counter makes it possible to determine the position of the electric motor 21 after the transition range is reached between the advance movement and the clamping movement. The dished springs 45 that are used, and the fact that the geometry of the axial movement of the hollow shaft 29 is known, mean that it is possible for the electronic control unit to be programmed in such a way that it performs a certain number of revolutions of the electric motor 21, with the effect that the three holding elements 5, 6 and 7 exert a defined clamping force Fs onto the surface of the workpiece 4.

If the clamped condition between the workpiece 4 and the holding elements 5, 6 and 7 is to be released, the direction of motion of the electric motor 21 is reversed with the effect that it rotates in the opposite direction in relation to the driving or clamping direction. This measure means that initially the shaft 26 turns back via the flange 24 in the direction of a cover which closes off the drive unit housing 63, and indeed until the pin 33 engages in the recess 32 due to the return force exerted by the coiled compression spring 36, meaning that once again there is a form-locking active connection via the clutch 62 between the shaft 26 and the hollow shaft 29. The coiled compression spring 46 arranged in the hollow shaft 29 causes the pin 39 to be moved back in the direction of a cover 18, with the effect that the bell-crank lever 41 moves back to its initial position along the pyramid-shaped free end 40 and the clamping force of the dished spring 45 is reduced.

As soon as the clutch 62 has achieved the form-locking active connection between the shaft 26 and the hollow shaft 29, the threaded spindle 14 is set rotating via the hollow shaft 29, with the effect that the middle piece 8 is moved away from the workpiece 4, as a result of which the three holding elements 5, 6 and 7 swivel open and thereby release the workpiece 4.

For the sake of completeness, reference is made to design features in order to mount the drive unit 61 on a fixed bearing 19 and a loose bearing 20, by means of which the rotational forces occasioned by the bearing housing 64 are passed on to the drive unit housing. Furthermore, another coiled compression spring 47 is provided in the circumferential direction of the hollow shaft 29 by means of which a return force acting on the bell-crank lever 41 is additionally created.

As a result, the electric motor 21 drives the drive unit 61 with a constant speed of rotation, which is the case during both the advance movement and the clamping movement of the three holding elements 5, 6 and 7. The clutch 62 disposed between the shaft 26 and the hollow shaft 29 transmits this constant speed of rotation. Therefore the threaded spindle 14 turns as a result of this speed of rotation combined with the pitch of the trapezoidal thread 30, with the effect that the middle piece 8 is moved axially in the direction of the workpiece 4 at a constant, predetermined speed. This shall be regarded as the first advance speed of the middle piece 8.

As soon as the rollers 11 of the three holding elements 5, 6 and 7 reach the surface of the workpiece 4, the torque rises as explained above, with the effect that the form-locking active connection of the clutch 62 between the shaft 26 and the hollow shaft 29 is released.

The shaft 26 continues to be induced to rotate, and as a result of the decoupling from the hollow shaft 29, it moves in a helical manner in relation to the hollow shaft 29 in the direction of the workpiece 4 where it exerts an axially vectored pressure force onto the pin 39 which is, as a result, pushed in the lengthways direction up to the workpiece 4. As a result, the two bell-crank levers 41 located opposite one another are opened out, because the webb 43 slides outwards over the pyramid-shaped free end 40 of the pin 39. This clamping movement created by the bell-crank lever 41 and the axial movement of the shaft 26 shall be regarded as the second advance speed of the middle piece 8.

Even if the middle piece 8 is only moved slightly towards the workpiece 4 and the second advance speed tends to zero, the speed does exist nevertheless. This is what creates advance force Fz. This means, purely physically speaking, that the first advance speed transmits the advance force Fz onto the middle piece 8 in which case the advance force Fz tends to zero, because the movements of the middle piece 8 in the longitudinal direction are not obstructed. If, on the other hand, the middle piece 8 can no longer be axially moved in the direction of the workpiece 4 then the second advance speed tends to zero and a clamping force Fs is built up by the integrated dished springs 45.

Starting from the transitional position between the advance and clamping movements of the middle piece 8, it is possible to calculate how many revolutions the electric motor 21 needs to perform in order to transfer a specified clamping force Fs onto the workpiece 4 by means of the three holding elements 5, 6 and 7, because the clamping force can be calculated from the specified spring characteristics of the dished springs 45 and the axial distance covered by the pin 39.

The invention claimed is:

1. A self-centering steady rest for clamping and/or holding a workpiece on a turning machine, wherein three holding elements are mounted in a housing of the steady rest and held adjustably in a common plane, two outer ones of said holding elements being configured as swivelling angled levers supported in the housing and in a mirror-image arrangement with one another, wherein the middle holding element is guided in the housing by means of a drive unit and a middle piece in a driveable connection with the drive unit such as to be axially moveable in the direction of the workpiece, control surfaces provided on the middle piece, the two outer holding elements being adapted to interact with the control surfaces by means of inner ends of the holding elements wherein the drive unit is driven by an electric motor and rotational movements of the electric motor are converted by the drive unit into at least two different axial advance speeds of the middle piece with resulting force components vectored onto the workpiece, and in order to set a corresponding advance speed of the middle piece between the middle piece and the electric motor, a clutch with a constrained action is provided, by means of which the drive unit can be changed over automatically into two different shift positions;

and wherein the drive unit comprises a shaft and a hollow shaft enclosing said shaft in areas in a longitudinal direction of said shaft, and said shaft and said hollow shaft are in a force-locking, or releasable form-locking, active connection by means of said clutch;

wherein said clutch is configured as a spring-loaded pin, the pin being arranged in a hole disposed in said shaft and aligned at right angles to a longitudinal axis of the steady rest, and a recess is provided in the inside of said hollow shaft, in which the pin engages during advance and return movement of said three holding elements, and the pin is moved out of the recess whilst said holding elements clamp the workpiece.

2. The steady rest in accordance with claim 1,
wherein a hole is provided at right angles to the pin in which a coiled compression spring is disposed, the coiled compression spring is held with a free end thereof in a notch disposed in the pin, and the coiled compression spring presses the pin into the recess in said hollow shaft under a preload.

3. The steady rest in accordance with claim 2,
wherein the recess is provided with an inclined surface arranged in the driving rotation direction of the electric motor and the pin is in contact with the inclined surface, and the wall of the recess opposite to the inclined surface extends in a radial direction.

4. The steady rest in accordance with claim 1,
wherein a thread, is disposed on an outer contour of said shaft, and an internal thread corresponding with a trapezoidal thread of said shaft is provided in the inside of said hollow shaft, wherein the threads are moveable relative to one another according to the position of the clutch.

5. The steady rest in accordance with claim 1, wherein said shaft lies flush against a pin which runs flush with the longitudinal axis of the steady rest, and a free end of a pin located opposite to said shaft is embodied as a pyramid-shaped contact surface tapering in the direction of the workpiece.

6. The steady rest in accordance with claim 5, wherein at least one bell-crank lever is provided on the outside of a pyramid-shaped plane of the pin, and levers are arranged in pairs opposite to one another, and a recess is disposed in said hollow shaft in order to accommodate the corresponding bell-crank lever, and free ends of the corresponding bell-crank lever are arranged in a bearing housing of the electric motor with a transmission element disposed in the bearing housing, and a free end of the bell-crank lever located opposite the transmission element is supported in said hollow shaft which is disposed in a force-locking, or form-locking, active connection with a threaded spindle in driveable connection with the middle piece.

7. The steady rest in accordance with claim 6, wherein a coiled compression spring is arranged between the pin and the threaded spindle and is disposed in the threaded spindle, by means of which the pin is acted upon by a return force acting in the direction of said shaft.

8. The steady rest in accordance with claim 1, wherein the middle piece is held in the housing of the steady rest in an axially adjustable and rotationally fixed manner, and a threaded hole is disposed in the middle piece flush with a longitudinal axis of the steady rest, and a threaded spindle engages in a threaded hole, the threaded spindle being attached to the hollow shaft by means of a holding pin running at right angles to the longitudinal axis of the steady rest, and at least one bell-crank lever is disposed in a recess in the hollow shaft and is arranged between a bearing housing of the electric motor and the hollow shaft, and
wherein the bell-crank lever is in contact with a transmission element of the bearing housing.

9. The steady rest in accordance with claim 1, wherein an axially movable active connection is disposed between the shaft and a flange connected in a rotationally fixed arrangement with the electric motor and the shaft, and the shaft is disposed in parallel with the longitudinal axis of the steady rest such that the shaft is guided along the inside contour of the flange.

10. The steady rest in accordance with claim 1, wherein the electric motor is disposed coaxially, or flush, with the longitudinal axis of the steady rest adjacent to the housing, and the electric motor encloses the drive unit, at least partially, in the circumferential direction of the drive unit.

11. The steady rest in accordance with claim 6, wherein one or more dished springs are disposed between the bearing housing and a first free end of the bell-crank lever, by means of which a predetermined clamping force is exerted on the three holding elements throughout a clamped condition.

12. The steady rest in accordance with claim 1, wherein said drive shaft and the electric motor are provided with an angle measuring device and an electronic control unit, and rotation speed of the electric motor is reduced by the electronic control unit directly before reaching a stop between the three holding elements and the workpiece, and/or the angle measurement of the electric motor permits force control, or an angle measurement, of the middle piece, by means of which a number of rotations of the electric motor can be set during a clamping movement.

* * * * *